(12) United States Patent
Zhu et al.

(10) Patent No.: US 10,891,938 B2
(45) Date of Patent: Jan. 12, 2021

(54) PROCESSING METHOD FOR SOUND EFFECT OF RECORDING AND MOBILE TERMINAL

(71) Applicant: GUANGDONG OPPO MOBILE TELECOMMUNICATIONS CORP., LTD., Guangdong (CN)

(72) Inventors: Kezhi Zhu, Guangdong (CN); Jian Wang, Guangdong (CN); Fenggui Yan, Guangdong (CN)

(73) Assignee: GUANGDONG OPPO MOBILE TELECOMMUNICATIONS AND CORP., LTD., Dongguan (CN)

( * ) Notice: Subject to any disclaimer, the term of this patent is extended or adjusted under 35 U.S.C. 154(b) by 0 days.

(21) Appl. No.: 16/678,712

(22) Filed: Nov. 8, 2019

(65) Prior Publication Data
US 2020/0168201 A1 May 28, 2020

(30) Foreign Application Priority Data
Nov. 27, 2018 (CN) .......................... 2018 1 1438046

(51) Int. Cl.
*G10K 15/08* (2006.01)
*G10L 21/0232* (2013.01)
(Continued)

(52) U.S. Cl.
CPC .......... *G10K 15/08* (2013.01); *G10L 21/0232* (2013.01); *H04N 7/14* (2013.01);
(Continued)

(58) Field of Classification Search
CPC ...... G10K 15/08; G10L 21/0232; H04N 7/14; H04R 1/406; H04R 3/005; H04R 29/005
(Continued)

(56) References Cited

U.S. PATENT DOCUMENTS

| 2003/0007648 A1* | 1/2003 | Currell .................... H04S 7/30 |
| | | 381/61 |
| 2004/0240652 A1 | 12/2004 | Kanada |

(Continued)

FOREIGN PATENT DOCUMENTS

| CN | 101350931 A | 1/2009 |
| CN | 102480671 A | 5/2012 |

(Continued)

OTHER PUBLICATIONS

English Translation of the Office Action for Application CN 201811438046.6, dated Aug. 29, 2019 (8 pages).
(Continued)

*Primary Examiner* — Quynh H Nguyen (57) ABSTRACT

A method of processing for sound effect of recording and a mobile terminal are disclosed in embodiments of the present disclosure. The method includes recording N audio signals generated from N sound sources, N being an integer greater than or equal to 2; obtaining location relationships of the N sound sources, determining a scene where the N sound sources are located in, and determining a reverberation algorithm according to the location relationships of the N sound sources and the scene where the N sound sources are located in; and performing a sound effect processing for the N audio signals according to the reverberation algorithm to obtain a reverbed sound effect.

17 Claims, 4 Drawing Sheets

(51) Int. Cl.
*H04N 7/14* (2006.01)
*H04R 1/40* (2006.01)
*H04R 3/00* (2006.01)
*H04R 29/00* (2006.01)

(52) U.S. Cl.
CPC ............ *H04R 1/406* (2013.01); *H04R 3/005* (2013.01); *H04R 29/005* (2013.01)

(58) Field of Classification Search
USPC .......................................................... 381/63
See application file for complete search history.

(56) References Cited

U.S. PATENT DOCUMENTS

| | | | |
|---|---|---|---|
| 2008/0144794 | A1 | 6/2008 | Gardner |
| 2013/0093837 | A1 | 4/2013 | Yue |
| 2015/0055798 | A1 | 2/2015 | Moon et al. |
| 2016/0212272 | A1 | 7/2016 | Srinivasan et al. |
| 2019/0387352 | A1* | 12/2019 | Jot .......................... H04S 7/305 |

FOREIGN PATENT DOCUMENTS

| | | |
|---|---|---|
| CN | 102713664 A | 10/2012 |
| CN | 102804806 A | 11/2012 |
| CN | 105263075 A | 1/2016 |
| CN | 107211180 A | 9/2017 |
| CN | 108010512 A | 5/2018 |
| CN | 108141684 A | 6/2018 |

OTHER PUBLICATIONS

International search report,PCT/CN2019/112781, dated Feb. 6, 2020 (4 pages).
International search report,PCT/CN2019/112781, dated Jun. 2, 2020 (4 pages).
European search report and Written Opinion for related European application No. 19209076.9, dated May 7, 2020 (7 pages).

* cited by examiner

PROCESSING METHOD FOR SOUND EFFECT OF RECORDING AND MOBILE TERMINAL

CROSS-REFERENCE TO RELATED APPLICATION(S)

This application claims priority to Chinese Patent Application No. 201811438046.6, filed on Nov. 27, 2018, the content of which is herein incorporated by reference in its entirety.

TECHNICAL FIELD

The present disclosure generally relates to the technical field of audio, and more particularly, to a processing method for sound effect of recording, a mobile terminal, and a non-transitory storage medium.

BACKGROUND

As the mobile terminals (such as mobile phones, tablets, etc.) are used widely, the mobile terminals can support more and more applications, of which the functions are more and more powerful. The mobile terminals are developing in a diversified and personalized direction, becoming indispensable electronic supplies in users' lives. Currently, recording is a necessary function for the mobile terminal.

SUMMARY

According to one aspect of the present disclosure, a processing method for sound effect of recording is provided, which includes: recording N audio signals generated from N sound sources, N being an integer greater than or equal to 2; obtaining location relationships of the N sound sources, determining a scene where the N sound sources are located in, and determining a reverberation algorithm according to the location relationships of the N sound sources and the scene where the N sound sources are located in; and performing a sound effect processing for the N audio signals according to the reverberation algorithm to obtain a reverbed sound effect.

According to another aspect of the present disclosure, a mobile terminal is provided, which includes a processor and a non-transitory memory storing one or more programs, wherein the one or more programs are configured to be executed by the processor to perform a method, and the method includes: recording N audio signals generated from N sound sources, N being an integer greater than or equal to 2; obtaining location relationships of the N sound sources, determining a scene where the N sound sources are located in, and determining a reverberation algorithm according to the location relationships of the N sound sources and the scene where the N sound sources are located in; and performing a sound effect processing for the N audio signals according to the reverberation algorithm to obtain a reverbed sound effect.

According to yet another aspect of the present disclosure, a non-transitory storage medium is provided, which stores one or more programs, when executed, causing a processor to perform a processing method, wherein the processing method includes: recording N audio signals generated from N sound sources, N being an integer greater than or equal to 2; obtaining location relationships of the N sound sources, determining a scene where the N sound sources are located in, and determining a reverberation algorithm according to the location relationships of the N sound sources and the scene where the N sound sources are located in; and performing a sound effect processing for the N audio signals according to the reverberation algorithm to obtain a reverbed sound effect.

BRIEF DESCRIPTION OF DRAWINGS

In order to make the technical solution described in the embodiments of the present disclosure or the related art more clearly, the drawings used for the description of the embodiments or the related art will be briefly described. Apparently, the drawings described below are only some embodiments of the present disclosure. It should be understood that, one skilled in the art may acquire other drawings based on these drawings, without making any inventive work.

DETAILED DESCRIPTION

In order to better understand the present disclosure for those skilled in the art, the technical solutions in the embodiments of the present disclosure are clearly and completely described in conjunction with the drawings in the embodiments of the present disclosure. It is obvious that the described embodiments are only a part of the embodiments of the present disclosure, and not all embodiments. All other embodiments obtained by the ordinary skilled in the art based on the embodiments in the present disclosure without the creative work are all within the scope of the present disclosure.

The terms "first", "second" and the like in the specification and claims of the present disclosure and the above drawings are used to distinguish different objects, and are not intended to describe a specific order. Furthermore, the terms "including" and "having", and any modification thereof are intended to cover unexclusive inclusion. For example, a process, method, system, product, or device that includes a series of steps or units is not limited to the listed steps or units, but optionally also includes steps or units not listed, or alternatively includes other steps or units inherent to these processes, methods, products, or equipment.

"Embodiment" herein means that a particular feature, structure, or characteristic described with reference to embodiments can be included in at least one embodiment of the present disclosure. The term appearing in various places in the specification are not necessarily referring to the same embodiment, and are not exclusive or alternative embodiments that are mutually exclusive with other embodiments. Those skilled in the art will understand explicitly and implicitly that the embodiments described herein can be combined with other embodiments.

A processing method for sound effect of recording is provided, which includes: recording N audio signals generated from N sound sources, N being an integer greater than or equal to 2; obtaining location relationships of the N sound sources, determining a scene where the N sound sources are located in, and determining a reverberation algorithm according to the location relationships of the N sound sources and the scene where the N sound sources are located in; and performing a sound effect processing for the N audio signals according to the reverberation algorithm to obtain a reverbed sound effect.

In one embodiment, the recording N audio signals generated from N sound sources includes: recording the N audio signals generated from N sound sources through N microphones each of which is arranged adjacent to a respective one of the N sound sources.

In one embodiment, the obtaining location relationships of the N sound sources includes: measuring a distance and a relative orientation between any two of the N microphones through a measuring device.

In one embodiment, the determining a reverberation algorithm according to the location relationships of the N sound sources and the scene where the N sound sources are located in includes: determining the reverberation algorithm according to the distance and relative orientation between any two of the N microphones and the scene where the N sound sources are located in.

In one embodiment, the method is applied to a video call terminal; and the obtaining location relationships of the N sound sources includes: obtaining a first location of each of the N sound sources with respect to the video call terminal.

In one embodiment, the determining a reverberation algorithm according to the location relationships of the N sound sources and the scene where the N sound sources are located in includes: determining the reverberation algorithm according to the first location of the each of the N sound sources with respect to the video call terminal and the scene where the N sound sources are located in.

In one embodiment, the scene where the N sound sources are located in includes an indoor scene; and the determining a reverberation algorithm according to the location relationships of the N sound sources and the scene where the N sound sources are located in includes: determining indoor parameters of the indoor scene, wherein the indoor parameters include a parameter of indoor area, a parameter of indoor volume, a parameter of indoor material, and a parameter of indoor air medium; determining reverberation parameters according to the indoor parameters and the location relationships of the N sound sources, wherein the reverberation parameters include a ratio of direct sounds, attenuation coefficients corresponding to the direct sounds, a radio of echoes, attenuation coefficients corresponding to the echoes, and a reverberation frequency range; and determining the reverberation algorithm according to the reverberation parameters.

In one embodiment, the performing a sound effect processing for the N audio signals according to the reverberation algorithm to obtain a reverbed sound effect includes: performing a denoising processing for the N audio signals to obtain the denoised N audio signals through a multi-noise filtering engine; and performing the sound effect processing for the denoised N audio signals according to the reverberation algorithm to obtain the reverbed sound effect.

In one embodiment, the method further includes transmitting the reverbed sound effect to a video call terminal to play the reverbed sound effect.

A mobile terminal is provided, which includes a processor and a non-transitory memory storing one or more programs, wherein the one or more programs are configured to be executed by the processor to perform a method, and the method includes: recording N audio signals generated from N sound sources, N being an integer greater than or equal to 2; obtaining location relationships of the N sound sources, determining a scene where the N sound sources are located in, and determining a reverberation algorithm according to the location relationships of the N sound sources and the scene where the N sound sources are located in; and performing a sound effect processing for the N audio signals according to the reverberation algorithm to obtain a reverbed sound effect.

In one embodiment, each of the N audio signals are recorded through a respective one of N microphones, and each of the N microphones is arranged adjacent to a respective one of the N sound sources.

In one embodiment, the location relationships of the N sound sources include a distance and a relative orientation between any two of the N microphones.

In one embodiment, the reverberation algorithm is determined according to the distance and the relative orientation between any two of the N microphones and the scene where the N sound sources are located in.

In one embodiment, the location relationships of the N sound sources include a first location of each of the N sound sources with respect to the mobile terminal.

In one embodiment, the reverberation algorithm is determined according to the first location of the each of the N sound sources with respect to the video call terminal and the scene where the N sound sources are located in.

In one embodiment, the scene where the N sound sources are located in includes an indoor scene; and the reverberation algorithm is determined according to reverberation parameters, wherein the reverberation parameters is determined according to indoor parameters of the indoor scene and the location relationships of the N sound sources and include a ratio of direct sounds, attenuation coefficients corresponding to the direct sounds, a radio of echoes, attenuation coefficients corresponding to the echoes, and a reverberation frequency range, and the indoor parameters include a parameter of indoor area, a parameter of indoor volume, a parameter of indoor material, and a parameter of indoor air medium.

A non-transitory storage medium is provided, which stores one or more programs, when executed, causing a processor to perform a processing method, wherein the processing method includes: recording N audio signals generated from N sound sources, N being an integer greater than or equal to 2; obtaining location relationships of the N sound sources, determining a scene where the N sound sources are located in, and determining a reverberation algorithm according to the location relationships of the N sound sources and the scene where the N sound sources are located in; and performing a sound effect processing for the N audio signals according to the reverberation algorithm to obtain a reverbed sound effect.

In one embodiment, each of the N audio signals are recorded through a respective one of N microphones, and each of the N microphones is arranged adjacent to a respective one of the N sound sources.

In one embodiment, the location relationships of the N sound sources include a distance and a relative orientation between any two of the N microphones.

In one embodiment, the scene where the N sound sources are located in includes an indoor scene; and the reverberation algorithm is determined according to reverberation parameters, wherein the reverberation parameters is determined according to indoor parameters of the indoor scene and the location relationships of the N sound sources and include a ratio of direct sounds, attenuation coefficients corresponding to the direct sounds, a radio of echoes, attenuation coefficients corresponding to the echoes, and a reverberation frequency range, and the indoor parameters include a parameter of indoor area, a parameter of indoor volume, a parameter of indoor material, and a parameter of indoor air medium.

The mobile terminal involved in the embodiments of the present disclosure may include various handheld devices, wireless devices, wearable devices, computing devices, or other processing devices connected to the wireless modem, which have wireless communication functions, and various forms of user equipment (UE), a mobile station (MS), the terminal device and the like. For convenience of description, the devices mentioned above are collectively referred to as mobile terminals.

The embodiments of the present disclosure are described in detail below.

Figure 1:
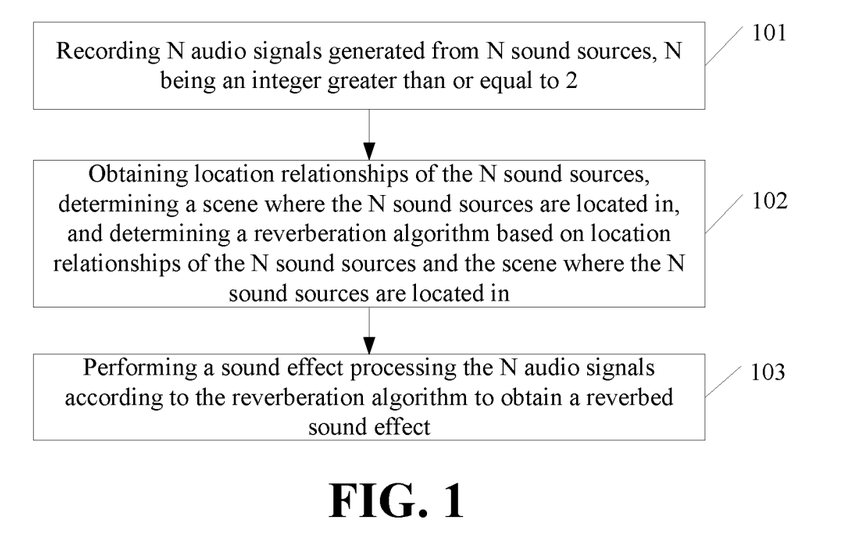
FIG. 1 is a flow chart of a processing method for sound effect of recording according to some embodiments of the present disclosure.

FIG. 1 is a flow chart of a processing method for sound effect of recording according to some embodiments of the present disclosure. The processing method may be executed by a mobile terminal described above. As shown in FIG. 1, the processing method for sound effect of recording includes actions/operations in the following blocks.

At block 101, the method records N audio signals generated from N sound sources, N being an integer greater than or equal to 2.

The processing method for sound effect according to embodiments of the present disclosure may be applied to a scene for recording multi-person audio, which is a scene where there are multiple sound sources to respectively emit a sound during the recording, for example, a scene of multi-person video conference. That is, in the scene of multi-person video conference, each sound source emits an audio signal during the recording, such that N audio signals are recorded.

N sound sources may refer to N persons in the process of recording. The mobile terminal records N audio signals generated from N sound sources through N microphones. Specifically, the mobile terminal separately records N audio signals generated from N sound sources, which means specifically that the mobile terminal records analog audio signals of N sound sources through N microphones, and performs analog conversion for the analog audio signals of the N sound sources according to a certain sampling frequency (for example, 22.05 kHz, 44.1 KHz, 48 KHz) to obtain the N audio signals generated from N sound sources. That is, each of N audio signal obtained by analog conversion means digital data.

Alternatively, block 101 may include actions in the following.

The method records N audio signals generated from N sound sources through N microphones each of which is arranged adjacent to a respective one of the N sound sources.

In one embodiment of the present disclosure embodiment, N microphones close to N sound sources, respectively. that is, each of N microphones closes to a respective sound source. The N microphones are configured for collecting sounds, which N sound sources emit, to form N audio signals. The data of audio signal may be stored in the mobile terminal in a certain audio format (for example, wave format, mp3 format, wma format). The mobile terminal may be in wired connection with the N microphones, and may also in wireless connection (for example, a Bluetooth connection). After N microphones collect N audio signals, the N audio signals are transmitted to the mobile terminal, and then the mobile terminal may perform a sound effect processing for the N audio signals.

At block 102, the method obtains location relationships of the N sound sources, determines a scene where the N sound sources are located in, and determines a reverberation algorithm based on location relationships of the N sound sources and the scene where the N sound sources are located in.

In one embodiment of the present disclosure, in a scene of multi-person live conference, the mobile terminal may obtain location relationships of the N sound sources, and determines the reverberation algorithm based on the relative location relationship of the N sound sources. In a scene of multi-person remote video conference, the mobile terminal may obtain location relationships of the N sound sources. The mobile terminal includes a first camera. The first camera is a camera which takes a picture of the N sound sources. In one embodiment, the location relationships of N sound sources include a location of each of the N sound sources with respect to the first camera. The reverberation algorithm may be determined based on the locations of the N sound sources with respect to the first camera. In another embodiment, the location relationships of N sound sources include a location of each of the N sound sources with respect to the first camera and a distance and relative orientation between any two of the N sound sources. The reverberation algorithm may be determined based on the location of each of the N sound sources with respect to the first camera and a distance and relative orientation between any two of the N sound sources.

In one embodiment, the location relationships of the N sound sources include a distance between any two of the N sound sources, relative orientation between any two of the N sound sources, and relative location relationship graph among the N sound sources. The reverberation algorithm may be determined based on the distance and relative orientation between any two of the N sound sources.

Figure 2:
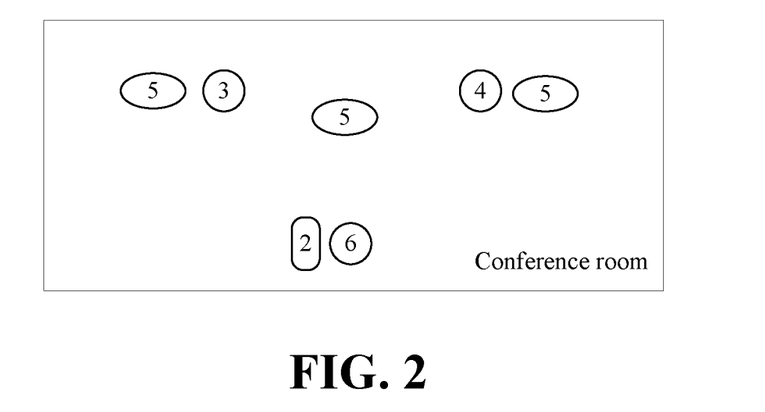
FIG. 2 is a diagram of a scene of multi-person video conference according to some embodiments of the present disclosure.

FIG. 2 is a diagram of a scene of multi-person video conference according to some embodiments of the present disclosure. As shown in FIGS. 2, 3, 4, and 6 in the conference room are participants, participants 3 and 4 are in the conference room, and participant 6 may be out of the conference room, which means a remote video conference. Participant 6 may be in the conference room, which means a live conference. 5 in the conference room refers to a microphone for recording multi-channel sound. FIG. 2 includes a relative location relationship graph among participants 3, 4, and 6.

An example of a remote video conference will be described in the following.

When the participant 6 is out of the conference room and is remote accessed, the relative distances between participants 3 and 6 and between the participants 4 and 6 can be identified through the camera 2, and sounds of the participants 3 and 4 are recorded through the microphone 5. After sounds of the participant 3 and the participant 4 are recorded through the microphone 5, the sounds will not directly played to the participant 6, but a reverberation algorithm is determined according to the distances and orientations between participant 3 and participant 6 and between the participant 4 and the participant 6 and parameters of the conference room (for example, volume, area, wall material, floor material, ceiling material of the conference room), and then the sounds of the participants 3 and 4 is processed according to the reverberation algorithm to obtain a reverbed sound effect. When the processed reverbed sound effect is played, the participant 6 can hear that the participant 3 is at left and the participant 4 is at right. Thus, the participant 6 who participates in the video conference remotely has the experience of participating in the conference on the spot, which improves sound effect of audio recorded in the remote video conference.

Alternatively, at block 102, the mobile terminal acquires location relationships of N sound sources, which includes the following.

(11) the mobile terminal measures a distance and a relative orientation between any two of the N microphones through a measuring device.

(12) the mobile terminal determines the location relationships of the N sound sources based on the distance and relative orientation between any two of the N microphones. That is, the location relationships of the N sound sources include a distance and a relative orientation between any two of the N sound sources.

In one embodiment of the present disclosure, in order to maintain a good sound receiving effect, a microphone is generally arranged adjacent to a sound source, and the location relationship of the sound source in embodiments of the present disclosure may be refer to the location relationship of the microphone arranged adjacent to the sound source.

Alternatively, the N sound sources are located in an indoor scene. At block 102, the mobile terminal determines the reverberation algorithm based on location relationships of the N sound sources and the scene where the N sound sources are located in, which includes the following.

(21) the mobile terminal determines indoor parameters of the indoor scene, and the indoor parameters include a parameter of indoor area, a parameter of indoor volume, a parameter of indoor material, and a parameter of indoor air medium.

(22) the mobile terminal determines reverberation parameters according to the indoor parameters and the location relationships of the N sound sources, and the reverberation parameters include a ratio of direct sounds, attenuation coefficients corresponding to the direct sounds, a radio of echo, attenuation coefficients corresponding to the echoes, and a reverberation frequency range.

(23) the mobile terminal determines the reverberation algorithm according to the reverberation parameters.

In one embodiment of the present disclosure, the indoor scene may be an indoor scene for a conference room. As the indoor parameters are different, corresponding reverberation parameters are also different. A model of the indoor scene may be established, and the indoor parameters of the indoor scene, the location relationships of the N sound source and relative location relationship between a virtual audio receiving end and the N sound source are input into the model to obtain the reverberation parameters. The virtual audio receiving end is a virtual location of the participant for remote video conference in the indoor scene, and the location of the virtual audio receiving end may be a location of a camera for the remote video conference.

Sound emitted by each of N sound sources may be respectively performed a sound effect processing with the reverberation algorithm, and then those sounds are collectively played through N speaker to form the reverbed effect.

At block 103, the method performs a sound effect processing the N audio signals according to the reverberation algorithm to obtain a reverbed sound effect.

In one embodiment of the present disclosure, an audio playing end of the audio recording scene (such as a conference room) plays audio. For the audio receiving end, the received audio signal includes a reflected sound signal after various complicated physical reflections, in addition to the direct sound signal directly transmitted from the audio playing end. The reflected sound signal arrives later than the direct sound signal and its energy is attenuated due to physical reflection. In different audio recording scenes, there will be a large difference in the delay of the reflected sound and the energy attenuation, where result in different hearing feelings at the audio receiving end. Therefore, for different audio recording scenes, different reverberation algorithms may be used for processing sound effect.

Figure 3:
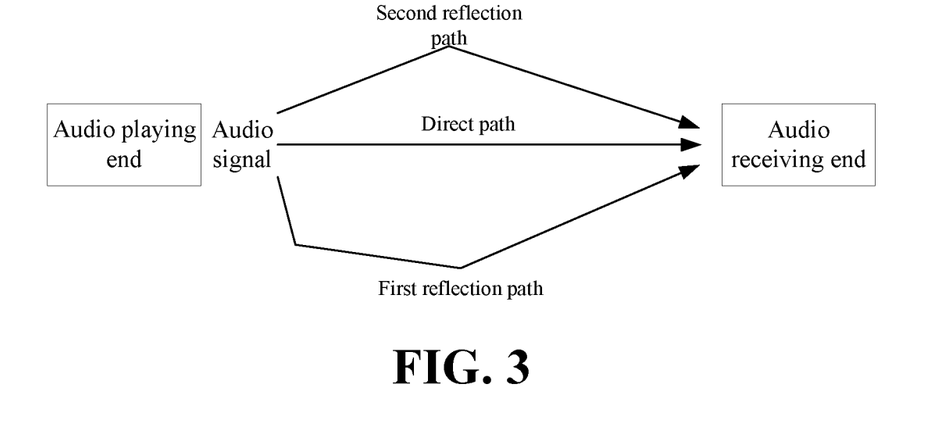
FIG. 3 is a diagram of analog transmission of an audio signal according to some embodiments of the present disclosure.

FIG. 3 is a diagram of analog transmission of an audio signal according to some embodiments of the present disclosure. The audio signal generated by the audio playing end in FIG. 3 can reach the audio receiving end in a direct manner and a reflection manner, and then a reverbed effect is formed at the audio receiving end. Two reflection paths are illustrated in FIG. 3, the first reflection path has two reflection to the audio receiving end, and the second reflection path has one reflection to the audio receiving end. FIG. 3 only illustrates an example for audio signal transmission. The audio signal may be reflected once, twice, or more than two times to reach the audio receiving end. For different audio recording scenes, the number of reflections and reflection paths are different. Regardless of whether the audio signal is direct or reflected, it will be attenuated at a certain degree. The attenuation coefficient is determined by the distance of the path, the number of reflections, the transmission medium, and the material of the reflection point.

In a scene for multi-person remote video conference, the reverberation algorithm may be determined according to location relationships of the N sound sources in the conference room in the scene for multi-person remote video conference and related parameters of the conference room (e.g., volume, area, wall material, floor material, ceiling material of the conference room). After N audio signals generated from the N sound sources are recorded, the N audio signals may be processed according to the determined reverberation algorithm to obtain the reverbed sound effect.

Alternatively, block 103 may specifically include the following.

(31) the method performs a denoising processing for the N audio signals to obtain the denoised N audio signals through a multi-noise filtering engine.

(32) the method performs a sound effect processing for the denoised N audio signals according to the reverberation algorithm to obtain the reverbed sound effect.

In embodiments of the present disclosure, before performing the sound effect processing, the mobile terminal may use the multi-noise filtering engine to perform the denoising processing for the N audio signals. Thus, noise generated during the recording is removed to improve recording effect.

In embodiments of the present disclosure, during an audio recording, the reverberation algorithm may be determined according to location relationships of N sound sources, and a sound effect processing is performed for the N audio signals generated from the N sound sources according to the determined reverberation algorithm. It is achieved that multiple audio signals of multiple sound sources are performed with a sound effect processing. A sound effect processing can be performed for multiple audio signals during a recording, so as to improve sound effect of an audio recorded in a multi-person audio recording scene.

Figure 4:
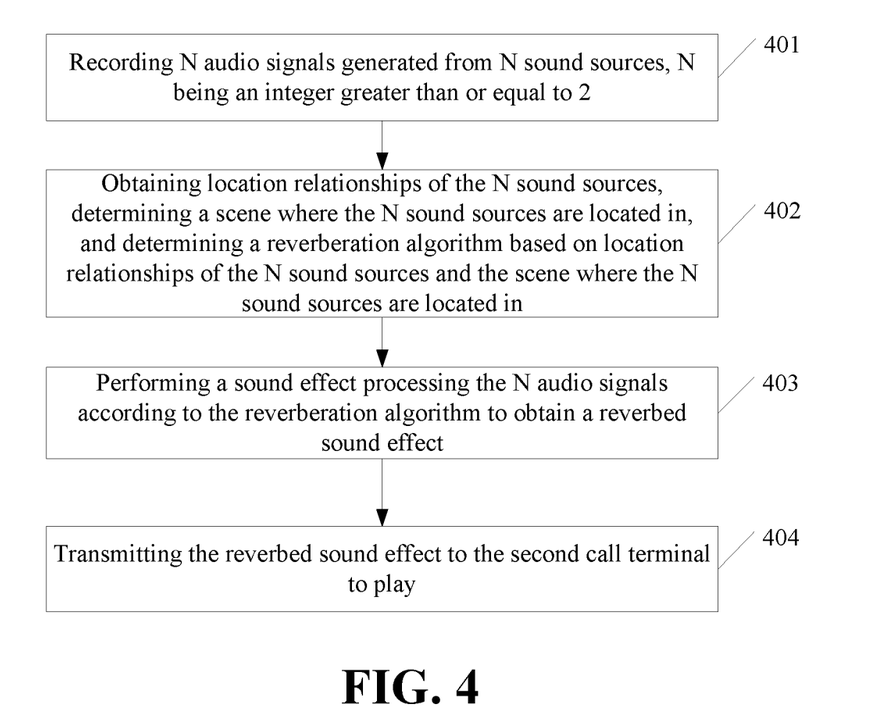
FIG. 4 is a flow chart of another processing method for sound effect of recording according to some embodiments of the present disclosure.

FIG. 4 a flow chart of another processing method for sound effect of a recording according to some embodiments of the present disclosure. FIG. 4 is obtained from optimization based on FIG. 1. The method of FIG. 4 is also executed by the mobile terminal. The mobile terminal is applied for video call. A video call system includes a first call terminal (i.e. the mobile terminal) and a second call terminal. As shown in FIG. 4, the processing method includes actions/operations in the following blocks.

At block 401, the method records N audio signals generated from N sound sources, N being an integer greater than or equal to 2.

At block 402, the method obtains location relationships of the N sound sources, determines a scene where the N sound sources are located in, and determines a reverberation algorithm based on location relationships of the N sound sources and the scene where the N sound sources are located in.

At block 403, the method performs a sound effect processing for the N audio signals according to the reverberation algorithm to obtain a reverbed sound effect.

For the specific implementation of the blocks 401 to 403 in the embodiments of the present disclosure, reference may be made to the blocks 101 to 103 shown in FIG. 1, and details are not described herein again.

At block 404, the method transmits the reverbed sound effect to the second call terminal to play.

The method in embodiments of the present disclosure is applied to a video call system, which includes at least two video call terminals (a first call terminal and a second call terminal), a multi-noise filtering processing engine, and a multi-noise filtering application programming interface (API) management server. The multi-noise filtering processing engine and the multi-noise filtering API management server are connected to the two video call terminals through a communication network. When a far-field video call is performed between the first call terminal and the second call terminal, far-end sound of a caller of the first call terminal and multiple noise sources are simultaneously received and recorded by the first call terminal. The multi-noise filter processing engine filters the far-field sound and multiple noise sources. The multi-noise filter API management server suppresses the multiple noise sources to enhances the sound of the caller. The second call terminal receives the processed sound of the caller. The call quality of voice data of a remote video call is improved in embodiments of the present disclosure improves.

The first call terminal may include a first camera, a plurality of first microphones, a first speaker, a first sound effect processing module, a first memory, and a first transceiver. A first camera is configured for capturing an image of N sound sources. Each of the first microphones is configured for recording one audio signals generated from a respective one of the N sound sources, and the number of first microphones is greater than or equal to N. The first sound effect processing module is configured for performing a sound effect processing for N audio signals generated from the N sound sources to obtain a reverbed sound effect. The first memory is configured for storing N audio signals generated from the N sound sources. The first transceiver is configured for transmitting the reverbed sound effect to the second call terminal. The first microphones may be a component of the first call terminal or a discrete module. When the first microphone is a discrete module, the first microphone includes a transceiver, and the transceiver of the first microphone is connected to the first transceiver of the first call terminal in wire or wirelessly.

The second call terminal may include a second camera, a second microphone, a plurality of second speakers, a second sound effect processing module, a second memory, and a second transceiver. The second call terminal and the first call terminal transmit audio data and sound effect data through the first transceiver and the second transceiver. The number of the second speakers is equal to or greater than N. The second call terminal may play the reverbed sound effect transmitted by the first call terminal through the second speakers. Thus, the reverbed effect is achieved.

Alternatively, at block 402, the method obtains location relationships of the N sound sources, which is the following specifically.

The mobile terminal obtains locations between the N sound sources and the first call terminal. That is, the location relationship of a sound source includes a location of the sound source with respect to the first call terminal.

At block 402, the mobile terminal determines the reverberation algorithm based on location relationships of the N sound sources and the scene where the N sound sources are located in, which is the following specifically.

The mobile terminal determines the reverberation algorithm based on locations between the N sound sources and the first call terminal and the scene where the N sound sources are located in. That is, the reverberation algorithm is determined based on locations of the N sound sources with respect to the first call terminal and the scene where the N sound sources are located in.

In one embodiment, the mobile terminal may obtain location of each of N sound sources with respect to the first call terminal.

In embodiments of the present disclosure, in the video call system, N audio signals of the first call terminal may be processed to obtain the reverbed sound effect, and the first call terminal transmits the reverbed sound effect to the second call terminal for playing. Thus, the second call terminal can hear sound with the reverbed sound effect. Therefore, the call quality of the voice data of the remote video call is improved.

The above description mainly introduces the solution of the embodiment of the present disclosure from the perspective of the execution process of the method side. It can be understood that, in order to implement the above functions, the mobile terminal includes corresponding hardware structures and/or software modules for performing various functions. Those skilled in the art will readily appreciate that the present disclosure can be implemented in hardware or a combination of hardware and computer software in combination with the elements and algorithm steps of the various examples described in the embodiments disclosed herein. Whether a function is implemented in hardware or a way of driving hardware by computer software depends on the specific application and design constraints of the solution. A person skilled in the art can use different methods for implementing the described functions for each particular application, but such implementation should not be considered to be beyond the scope of the present disclosure.

The embodiments of the present disclosure may divide the mobile terminal into function units according to the foregoing method examples. For example, each function unit may be divided according to each function, or two or more functions may be integrated into one processing unit. The above integrated unit can be implemented in the form of hardware or in the form of a software function unit. It should be noted that the division of the unit in the embodiments of the present disclosure is schematic, and is only a division for logical function. In actual implementation, there may be another division manner.

Figure 5:
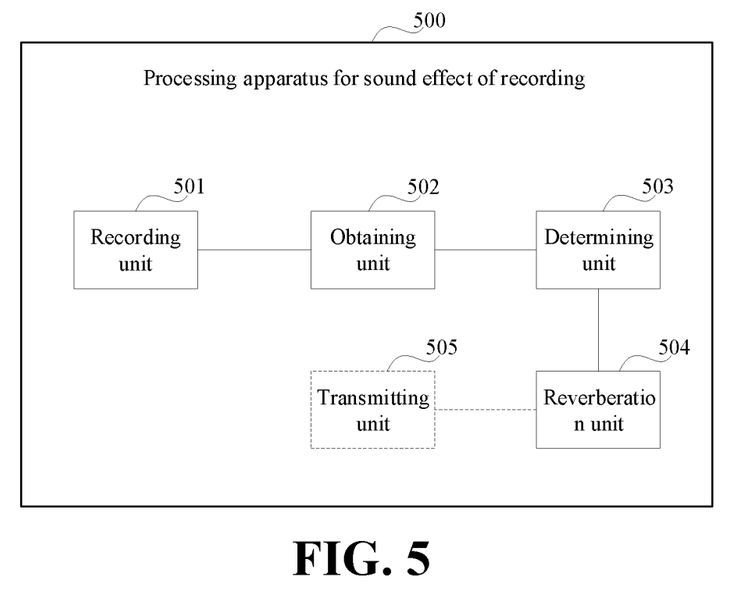
FIG. 5 is a schematic structural diagram of a processing apparatus for sound effect of recording according to some embodiments of the present disclosure.

FIG. 5 is a schematic structural diagram of a processing apparatus for sound effect of recording according to some embodiments of the present disclosure. As shown in FIG. 5, the processing apparatus 500 includes a recording unit 501, an obtaining unit 502, a determining unit 503, and a reverberation unit 504.

The recording unit 501 is configured for recording N audio signals generated from N sound sources, N being an integer greater than or equal to 2.

The obtaining unit 502 is configured for acquiring location relationships of the N sound sources.

The determining unit 503 is configured for determining a scene where the N sound sources are located in and determining a reverberation algorithm based on location relationships of the N sound sources and the scene where the N sound sources are located in.

The reverberation unit 504 is configured for performing a sound effect processing for the N audio signals according to the reverberation algorithm to obtain a reverbed sound effect.

Alternatively, the recording unit 501 records N audio signals generated from N sound sources, which is the following specifically.

Recording N audio signals generated from N sound sources through N microphones each of which is arranged adjacent to a respective one of the N sound sources.

Alternatively, the obtaining unit 502 obtains location relationships of the N sound sources, which is the following specifically.

Measuring a distance and a relative orientation between any two of the N microphones through a measuring device.

Determining the location relationships of the N sound sources based on the distance and relative orientation between any two of the N microphones.

Alternatively, the N sound sources are located in an indoor scene. The determining unit 503 determines a reverberation algorithm based on location relationships of the N sound sources and the scene where the N sound sources are located in, which includes the following specifically.

Determining indoor parameters of the indoor scene, and the indoor parameters include a parameter of indoor area, a parameter of indoor volume, a parameter of indoor material, and a parameter of indoor air medium.

Determining reverberation parameters according to the indoor parameters and the relative location relationship of the N sound sources, and the reverberation parameters include a ratio of direct sounds, attenuation coefficients corresponding to the direct sounds, a radio of echoes, attenuation coefficients corresponding to the echoes, and a reverberation frequency range.

Determining the reverberation algorithm according to the reverberation parameters.

Alternatively, the reverberation unit 504 performs a sound effect processing for the N audio signals according to the reverberation algorithm to obtain a reverbed sound effect, which includes the following specifically.

Performing a denoising processing for the N audio signals to obtain the denoised N audio signals through a multi-noise filtering engine.

Performing the sound effect processing for the denoised N audio signals according to the reverberation algorithm to obtain the reverbed sound effect.

Alternatively, the processing apparatus 500 is applied to a video call system, which includes a first call terminal and a second call terminal. The processing apparatus 500 may further include a transmitting unit 505.

The transmitting unit 505 is configured to transmit the reverbed sound effect from the first call terminal to the second call terminal for playing.

Alternatively, the obtaining unit 502 obtains location relationships of the N sound sources, which is the following specifically.

Obtaining locations between the N sound sources and the first call terminal.

The determining unit 503 determines the reverberation algorithm based on location relationships of the N sound sources and the scene where the N sound sources are located in, which is the following specifically.

Determining the reverberation algorithm based on locations between the N sound sources and the first call terminal and the scene where the N sound sources are located in.

The second call terminal includes N speakers.

In the processing apparatus as shown in FIG. 5, during an audio recording, the reverberation algorithm may be determined according to relative location relationship of N sound sources, and a sound effect processing is performed for the N audio signals generated from the N sound sources according to the determined reverberation algorithm. It is achieved that multiple audio signals of multiple sound sources are performed with a sound effect processing. A sound effect processing can be performed for multiple audio signals during a recording, so as to improve sound effect of an audio recorded in a multi-person audio recording scene.

Figure 6:
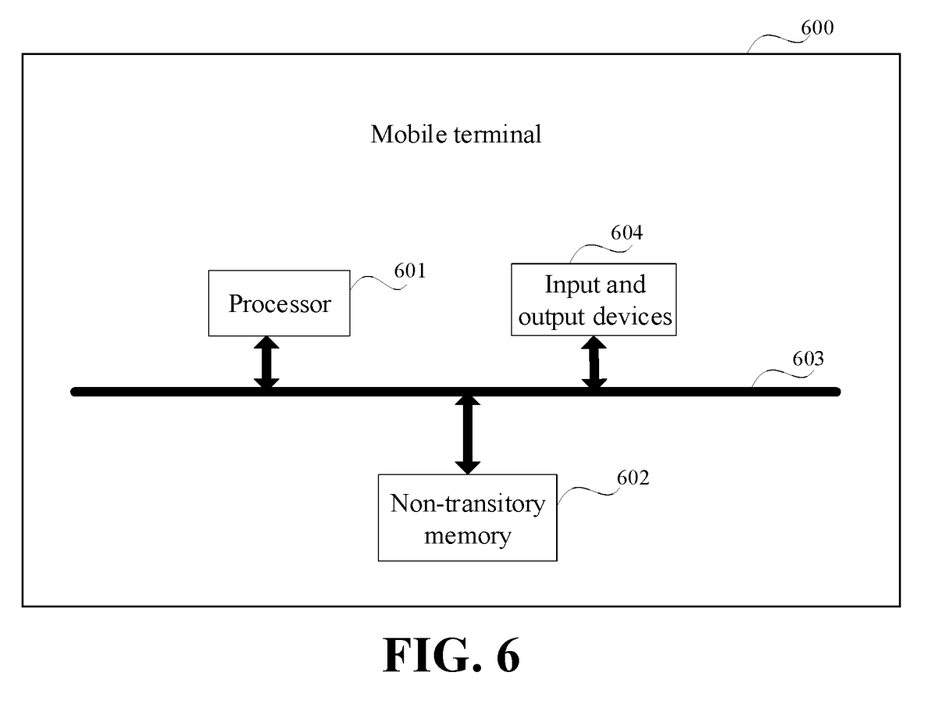
FIG. 6 is a schematic structural diagram of a mobile terminal according to some embodiments of the present disclosure.

FIG. 6 is a schematic structural diagram of a mobile terminal according to some embodiments of the present disclosure. As shown in FIG. 6, the mobile terminal 600 includes a processor 601 and a non-transitory memory 602. The mobile terminal 600 may further include a bus 603. The processor 601 and the non-transitory memory 602 may be connected to each other through the bus 603. The bus 603 may be a Peripheral Component Interconnect (PCI) bus or an Extended Industry Standard Architecture (EISA) bus. The bus 603 can be divided into an address bus, a data bus, a control bus, and the like. For ease of representation, only one thick line is shown in FIG. 6, which does not mean that there is only one bus or one type of bus. The mobile terminal 600 may further include input and output devices 604, and the input and output devices 604 may include a display screen, such as a liquid crystal display. The non-transitory memory 602 is configured for storing one or more programs including instructions. The processor 601 is configured to invoke the instructions stored in the non-transitory memory 602 to perform some or all of the method in FIGS. 1-5 described above. The mobile terminal 600 may also include N microphones and N speakers.

In the mobile terminal as shown in FIG. 6, during an audio recording, the reverberation algorithm may be determined according to relative location relationship of N sound sources, and a sound effect processing is performed for the N audio signals generated from the N sound sources according to the determined reverberation algorithm. It is achieved that multiple audio signals of multiple sound sources are performed with a sound effect processing. A sound effect processing can be performed for multiple audio signals during a recording, so as to improve sound effect of an audio recorded in a multi-person audio recording scene.

Figure 7:
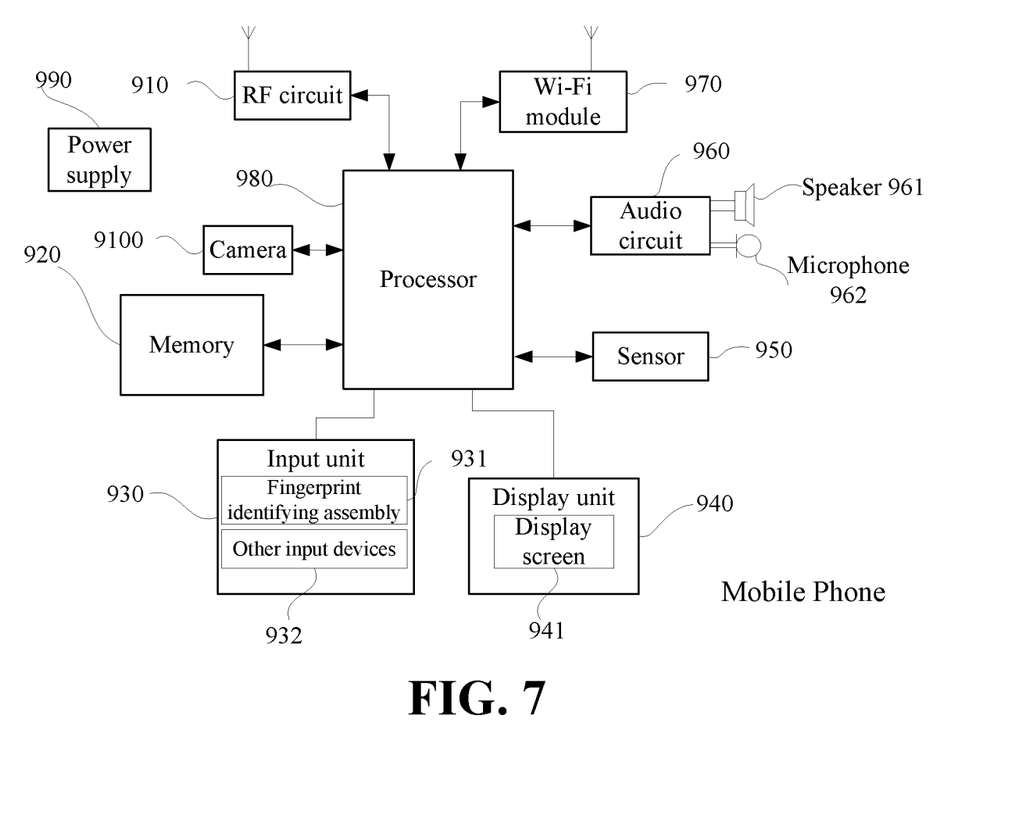
FIG. 7 is a schematic structural diagram of another mobile terminal according to some embodiments of the present disclosure.

Another mobile terminal is further provided in an embodiment of the present disclosure. As shown in FIG. 7, for the convenience of description, only the parts related to the embodiments of the present disclosure are shown. If the specific technical details are not disclosed, please refer to the method part of the embodiment of the present disclosure. The mobile terminal may be any terminal device including a mobile phone, a tablet computer, a PDA (Personal Digital Assistant), a POS (Point of Sales), an in-vehicle computer, and the like. The mobile terminal is used as a mobile phone as an example:

FIG. 7 is a block diagram showing a partial structure of a mobile phone related to a mobile terminal provided by an embodiment of the present disclosure. As shown in FIG. 7, the mobile phone includes a radio frequency (RF) circuit 910, a memory 920, an input unit 930, a display unit 940, a sensor 950, an audio circuit 960, a wireless fidelity (Wi-Fi) module 970, a processor 980, and a power supply 990. It will be understood by those skilled in the art that the structure of the mobile phone as shown in FIG. 7 does not constitute a limitation to the mobile phone, and may include more or less components than those illustrated, or some components may be combined, or different component arrangements.

The components of the mobile phone will be described in detail with reference to FIG. 7 in the following.

The RF circuit 910 can be used for receiving and emitting information. Usually, the RF circuit includes, but not limited to, an antenna, at least one amplifier, a transceiver, a coupler, a Low Noise Amplifier (LNA), a duplexer and so on. In addition, the RF circuit may further communicate with other devices via wireless communication and a network. The above wireless communication may use any communication standard or protocol, including but not limited to Global System of Mobile communication (GSM), General Packet Radio Service (GPRS), Code Division Multiple Access (Code Division), Multiple Access (CDMA), Wideband Code Division Multiple Access (WCDMA), Long Term Evolution (LTE), E-mail, Short Messaging Service (SMS), and the like.

The memory 920 may be configured to store software programs and modules, and the processor 980 executes various function applications and data processing of the mobile phone by running the software programs and the modules stored in the memory 920. The memory 920 may mainly include a program storage region and a data storage region, wherein the program storage region may store an operation system, application programs for at least one function (for example, an audio playing function, an image playing function, etc.), and the data storage region may store data (for example, audio data, telephone directory, etc.) created according to use of the mobile phone. In addition, the memory 920 may include a high-speed RAM, and may further include a non-volatile memory such as at least one of a disk storage device, a flash device, or other non-volatile solid storage devices.

The input unit 930 may be configured to receive input digital or character information and generate key signal input associated with user setting and functional control of the mobile phone. Specifically, the input unit 930 can include a fingerprint identification assembly 931 and other input devices 932. The fingerprint identification assembly 931 can collect data of a user's fingerprint. In addition to the fingerprint identification assembly 931, the input unit 930 may also include other input devices 932. Specifically, the other input devices 932 may include, but not limited to, one or more of a physical keyboard, a functional key (such as a volume control key and a switch key), a track ball, a mouse, an operating rod, etc.

The display unit 940 can be used to display information input by the user or information provided to the user as well as various menus of the mobile phone. The display unit 940 may include a display screen 941, which is alternatively configured to be a Liquid Crystal Display (LCD), an Organic Light-Emitting Diode (OLED) and the like.

The mobile phone may also include at least one type of sensor 950, such as a light sensor, motion sensor, and other sensors. Specifically, the light sensor may include an ambient light sensor (also called light sensor) and a proximity sensor, wherein the ambient light sensor may adjust the brightness of the display screen 941 according to the brightness of the ambient light, and the proximity sensor may turn off the display screen 941 and/or backlight when the mobile phone is moved to the ear. As a motion sensor, the accelerometer sensor can detect the magnitude of acceleration in all directions (usually three axes). When it is stationary, it can detect the magnitude and direction of gravity, which can be used to identify the gesture of the mobile phone (such as horizontal and vertical screen switching, related games, magnetometer attitude calibration), vibration recognition related functions (such as pedometer, tapping), etc. Other sensors such as gyroscopes, barometers, hygrometers, thermometers, infrared sensors can be configured on the mobile phone, which are no longer described herein.

An audio circuit 960, a speaker 961 and a microphone 962 may provide an audio interface between the user and the mobile phone. The audio circuit 960 can convert the received audio data to the electrical data and then emit to the speaker 961. The speaker 961 then converts to the sound signal. On the other hand, the microphone 962 converts the collected sound signal into an electrical signal. The audio circuit 960 receives the electrical signal and then convert it into audio data. The processor 980 processes the audio data and then transmits another mobile phone via the RF circuit 910, or transmits to the memory 920 for further processing.

Wi-Fi belongs to a short-range wireless transmission technology. The mobile phone may assist the user to receive and send e-mails, webpage browsing, access to streaming media and the like by means of the Wi-Fi module 970, which provides a wireless wideband internet access for the user. Although the Wi-Fi module 970 is illustrated in FIG. 7, it may be understood that, it may be optional components of the mobile phone and may totally be omitted without changing the essence of the present disclosure as claimed.

The processor 980 is a control center of the mobile phone, which is connected to all parts of the mobile phone by utilizing various interfaces and lines and execute various functions and processing data of the mobile phone by running or executing the software program and/or the module stored in the memory and calling data stored in the memory 920. Thus, it wholly monitors the mobile phone. Optionally, the processor 980 may include one or more processing units. The processor 980 may be integrated with an application processor and a modulation-demodulation processor. The application processor mainly processes an operation system, a user interface, an application program and the like, and the modulation-demodulation processor mainly processes wireless communication. It will be appreciated that the above described modulation-demodulation processor may also not be integrated into the processor 980.

The mobile phone also includes a power supply 990 (such as a battery) that supplies power to the various components. Preferably, the power supply can be logically coupled to the processor 980 through a power management system to manage functions such as charging, discharging, and power management through the power management system.

The mobile phone may further include a camera 9100. The camera 9100 is configured to capture an image or a video, and transmit the captured image and video to the processor 980 to be processed.

The mobile phone may further include a Bluetooth module, and the like, which are not described in detail herein again.

In the foregoing embodiments shown in FIG. 1 to FIG. 4, each actions/operation of the method can be implemented based on the structure of the mobile phone.

A computer storage medium is further provided in embodiments of the present disclosure. The computer storage medium stores computer programs for electronic data exchange. The computer programs cause a computer to perform some or all of the actions of any of the processing methods described in the foregoing embodiments.

A computer program product is provided in embodiments of the present disclosure. The computer program product includes a non-transitory computer readable storage medium storing a computer program. The computer programs cause a computer to perform some or all of the actions of any of the processing methods described in the foregoing embodiments.

It should be noted that, for the foregoing method embodiments, for the sake of brevity, they are all described as a series of action combinations, but those skilled in the art should understand that the present disclosure is not limited by the described action sequence. Because certain steps may be performed in other sequences or concurrently in accordance with the present disclosure. In the following, those skilled in the art should also understand that the embodiments described in the specification are all preferred embodiments, and the actions and modules involved are not necessarily required by the present disclosure.

In the above embodiments, the descriptions of the various embodiments are all focused on, and the parts that are not detailed in a certain embodiment can be referred to the related descriptions of other embodiments.

In several embodiments provided herein, it should be understood that the disclosed apparatus may be implemented in other ways. For example, the device embodiments described above are merely illustrative. For example, the division of the above units is only a logical function division. In actual implementation, there may be another division manner. For example, multiple units or components may be combined or integrated to another system, or some features can be ignored or not executed. In addition, the mutual coupling or direct coupling or communication connection shown or discussed may be an indirect coupling or communication connection through some interface, device or unit, and may be electrical or otherwise.

The units described above as separate components may or may not be physically separated, and the components illustrated as units may or may not be physical units, which may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately. Alternatively, two or more units may also be integrated into one unit. The above integrated unit can be implemented in the form of hardware or in the form of a software functional unit.

The above-described integrated unit can be stored in a computer readable memory if it is implemented in the form of a software functional unit and sold or used as a standalone product. Based on such understanding, the technical solution of the present disclosure, in essence or the contribution to the prior art, or all or part of the technical solution may be embodied in the form of a software product. The software product is stored in a memory, which includes a number of instructions causing a computer device (which may be a personal computer, server or network device, etc.) to perform all or part of the actions of the above-described methods of various embodiments of the present disclosure. The foregoing memory includes a U disk, a Read-Only Memory (ROM), a Random Access Memory (RAM), a removable hard disk, a magnetic disk, or an optical disk, and the like, which can store program codes.

One of ordinary skill in the art can understand that all or part of the various methods of the above embodiments can be completed by related hardware instructed by a program. The program can be stored in a computer readable memory, and the memory can include a flash drive, read-only memory (ROM), random access memory (RAM), disk or CD.

The embodiments of the present disclosure have been described in detail above, and the principles and implementations of the present disclosure are described in the specific examples. The description of the above embodiments is only used to help understand the method of the present disclosure and its core ideas. For a person skilled in the art, there will have a change in the specific embodiments and the scope of present disclosure according to the idea of the present disclosure. In summary, the content of the present specification should not be construed as limiting the present disclosure.

What is claimed is:

1. A method of processing for sound effect of recording, comprising:
    recording N audio signals generated from N sound sources, N being an integer greater than or equal to 2;
    obtaining location relationships of the N sound sources, determining a scene where the N sound sources are located in, and determining a reverberation algorithm according to the location relationships of the N sound sources and the scene where the N sound sources are located in; and
    performing a sound effect processing for the N audio signals according to the reverberation algorithm to obtain a reverbed sound effect;
    wherein the scene where the N sound sources are located in comprises an indoor scene;
    and the determining the reverberation algorithm according to the location relationships of the N sound sources and the scene where the N sound sources are located in comprises:
        determining indoor parameters of the indoor scene, wherein the indoor parameters comprise a parameter of indoor area, a parameter of indoor volume, a parameter of indoor material, and a parameter of indoor air medium;
        determining reverberation parameters according to the indoor parameters and the location relationships of the N sound sources, wherein the reverberation parameters comprise a ratio of direct sounds, attenuation coefficients corresponding to the direct sounds, a radio of echoes, attenuation coefficients corresponding to the echoes, and a reverberation frequency range; and
        determining the reverberation algorithm according to the reverberation parameters.

2. The method of claim 1, wherein recording the N audio signals generated from the N sound sources comprises:

recording the N audio signals generated from the N sound sources through N microphones, each of which is arranged adjacent to a respective one of the N sound sources.

3. The method of claim 2, wherein obtaining the location relationships of the N sound sources comprises:
measuring a distance and a relative orientation between any two of the N microphones through a measuring device.

4. The method of claim 3, wherein determining the reverberation algorithm according to the location relationships of the N sound sources and the scene where the N sound sources are located in comprises:
determining the reverberation algorithm according to the distance and relative orientation between any two of the N microphones and the scene where the N sound sources are located in.

5. The method of claim 1, wherein the method is applied to a video call terminal; and
obtaining the location relationships of the N sound sources comprises:
obtaining a first location of each of the N sound sources with respect to the video call terminal.

6. The method of claim 5, wherein determining the reverberation algorithm according to the location relationships of the N sound sources and the scene where the N sound sources are located in comprises:
determining the reverberation algorithm according to the first location of the each of the N sound sources with respect to the video call terminal and the scene where the N sound sources are located in.

7. The method of claim 1, wherein performing the sound effect processing for the N audio signals according to the reverberation algorithm to obtain the reverbed sound effect comprises:
performing a denoising processing for the N audio signals to obtain the denoised N audio signals through a multi-noise filtering engine; and
performing the sound effect processing for the denoised N audio signals according to the reverberation algorithm to obtain the reverbed sound effect.

8. The method of claim 1, further comprising:
transmitting the reverbed sound effect to a video call terminal to play the reverbed sound effect.

9. A mobile terminal, comprising a processor and a non-transitory memory storing one or more programs, wherein the one or more programs are configured to be executed by the processor to perform a method, and the method comprises:
recording N audio signals generated from N sound sources, N being an integer greater than or equal to 2;
obtaining location relationships of the N sound sources, determining a scene where the N sound sources are located in, and determining a reverberation algorithm according to the location relationships of the N sound sources and the scene where the N sound sources are located in; and
performing a sound effect processing for the N audio signals according to the reverberation algorithm to obtain a reverbed sound effect;
wherein the scene where the N sound sources are located in comprises an indoor scene; and the reverberation algorithm is determined according to reverberation parameters, wherein the reverberation parameters are determined according to indoor parameters of the indoor scene and the location relationships of the N sound sources and comprise a ratio of direct sounds, attenuation coefficients corresponding to the direct sounds, a radio of echoes, attenuation coefficients corresponding to the echoes, and a reverberation frequency range, and the indoor parameters comprise a parameter of indoor area, a parameter of indoor volume, a parameter of indoor material, and a parameter of indoor air medium.

10. The mobile terminal of claim 9, wherein each of the N audio signals are recorded through a respective one of N microphones, and each of the N microphones is arranged adjacent to a respective one of the N sound sources.

11. The mobile terminal of claim 10, wherein the location relationships of the N sound sources comprise a distance and a relative orientation between any two of the N microphones.

12. The mobile terminal of claim 11, wherein the reverberation algorithm is determined according to the distance and the relative orientation between any two of the N microphones and the scene where the N sound sources are located in.

13. The mobile terminal of claim 9, wherein the location relationships of the N sound sources comprise a first location of each of the N sound sources with respect to the mobile terminal.

14. The mobile terminal of claim 13, wherein the reverberation algorithm is determined according to the first location of the each of the N sound sources with respect to the mobile terminal and the scene where the N sound sources are located in.

15. A non-transitory storage medium storing one or more programs, when executed, causing a processor to perform a processing method, wherein the processing method comprises:
recording N audio signals generated from N sound sources, N being an integer greater than or equal to 2;
obtaining location relationships of the N sound sources, determining a scene where the N sound sources are located in, and determining a reverberation algorithm according to the location relationships of the N sound sources and the scene where the N sound sources are located in; and
performing a sound effect processing for the N audio signals according to the reverberation algorithm to obtain a reverbed sound effect;
wherein the scene where the N sound sources are located in comprises an indoor scene; and the reverberation algorithm is determined according to reverberation parameters, wherein the reverberation parameters are determined according to indoor parameters of the indoor scene and the location relationships of the N sound sources and comprise a ratio of direct sounds, attenuation coefficients corresponding to the direct sounds, a radio of echoes, attenuation coefficients corresponding to the echoes, and a reverberation frequency range, and the indoor parameters comprise a parameter of indoor area, a parameter of indoor volume, a parameter of indoor material, and a parameter of indoor air medium.

16. The non-transitory storage medium of claim 15, wherein each of the N audio signals are recorded through a respective one of N microphones, and each of the N microphones is arranged adjacent to a respective one of the N sound sources.

17. The non-transitory storage medium of claim 16, wherein the location relationships of the N sound sources comprise a distance and a relative orientation between any two of the N microphones.

* * * * *

UNITED STATES PATENT AND TRADEMARK OFFICE
CERTIFICATE OF CORRECTION

PATENT NO. : 10,891,938 B2
APPLICATION NO. : 16/678712
DATED : January 12, 2021
INVENTOR(S) : Kezhi Zhu, Jian Wang and Fenggui Yan Page 1 of 1

It is certified that error appears in the above-identified patent and that said Letters Patent is hereby corrected as shown below:

On the Title Page

Item (73) Assignee: please delete "GUANGDONG OPPO MOBILE TELECOMMUNICATIONS AND CORP., LTD." and insert -- GUANGDONG OPPO MOBILE TELECOMMUNICATIONS CORP., LTD. --

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*